US009235959B2

(12) United States Patent
Walker et al.

(10) Patent No.: US 9,235,959 B2
(45) Date of Patent: *Jan. 12, 2016

(54) METHOD AND APPARATUS FOR PROVIDING A BONUS TO A PLAYER BASED ON A CREDIT BALANCE

(71) Applicant: IGT, Reno, NV (US)

(72) Inventors: Jay S. Walker, Ridgefield, CT (US); Stephen C. Tulley, Fairfield, CT (US); James A. Jorasch, Stamford, CT (US); Russell P. Sammon, San Francisco, CA (US); Geoffrey M. Gelman, Stamford, CT (US)

(73) Assignee: IGT, Las Vegas, NV (US)

( * ) Notice: Subject to any disclaimer, the term of this patent is extended or adjusted under 35 U.S.C. 154(b) by 276 days.

This patent is subject to a terminal disclaimer.

(21) Appl. No.: 13/936,695

(22) Filed: Jul. 8, 2013

(65) Prior Publication Data

US 2013/0296032 A1    Nov. 7, 2013

Related U.S. Application Data

(63) Continuation of application No. 13/911,761, filed on Jun. 6, 2013, which is a continuation of application No. 10/419,306, filed on Apr. 18, 2003, now Pat. No. 8,480,482.

(60) Provisional application No. 60/373,749, filed on Apr. 18, 2002.

(51) Int. Cl.
G06F 17/00 (2006.01)
G07F 17/32 (2006.01)
G06Q 30/02 (2012.01)

(52) U.S. Cl.
CPC ............ G07F 17/3244 (2013.01); G06Q 30/02 (2013.01); G07F 17/32 (2013.01)

(58) Field of Classification Search
None
See application file for complete search history.

(56) References Cited

U.S. PATENT DOCUMENTS

| 3,628,259 | A | 12/1971 | Kahn |
| 4,013,157 | A | 3/1977 | Britz et al. |
| 4,156,976 | A | 6/1979 | Mikun |
| 4,621,814 | A | 11/1986 | Stepan et al. |
| 4,624,459 | A | 11/1986 | Kaufman |
| 4,636,951 | A | 1/1987 | Harlick |
| 4,669,731 | A | 6/1987 | Clarke |
| 4,695,053 | A | 9/1987 | Vazquez, Jr. et al. |
| 4,805,907 | A | 2/1989 | Hagiwara |
| 4,838,552 | A | 6/1989 | Hagiwara |
| 4,991,848 | A | 2/1991 | Greenwood et al. |
| 5,011,159 | A | 4/1991 | Fortunato et al. |
| 5,019,973 | A | 5/1991 | Wilcox et al. |
| 5,088,737 | A | 2/1992 | Frank et al. |
| 5,116,055 | A | 5/1992 | Tracy |
| 5,123,649 | A | 6/1992 | Tiberio |
| 5,167,413 | A | 12/1992 | Fulton |
| 5,224,706 | A | 7/1993 | Bridgeman et al. |
| 5,294,120 | A | 3/1994 | Schultz |
| 5,294,128 | A | 3/1994 | Marquez |
| 5,321,241 | A | 6/1994 | Craine |
| 5,332,076 | A | 7/1994 | Ziegert |
| 5,342,047 | A | 8/1994 | Heidel et al. |
| 5,344,144 | A | 9/1994 | Canon |
| 5,356,140 | A | 10/1994 | Dabrowski et al. |
| 5,375,830 | A | 12/1994 | Takemoto et al. |
| 5,377,973 | A | 1/1995 | Jones et al. |
| 5,397,125 | A | 3/1995 | Adams |
| 5,401,023 | A | 3/1995 | Wood |
| 5,415,404 | A | 5/1995 | Joshi et al. |
| 5,489,101 | A | 2/1996 | Moody |
| 5,511,781 | A | 4/1996 | Wood et al. |
| 5,513,102 | A | 4/1996 | Auriemma |
| 5,531,448 | A | 7/1996 | Moody |
| 5,542,669 | A | 8/1996 | Charron et al. |
| 5,570,885 | A | 11/1996 | Ornstein |
| 5,580,055 | A | 12/1996 | Hagiwara |
| 5,584,486 | A | 12/1996 | Franklin |
| 5,584,764 | A | 12/1996 | Inoue |
| 5,593,161 | A | 1/1997 | Boylan et al. |
| 5,611,535 | A | 3/1997 | Tiberio |
| 5,645,485 | A | 7/1997 | Clapper, Jr. |
| 5,657,993 | A | 8/1997 | Merlino et al. |
| 5,678,001 | A | 10/1997 | Nagel et al. |
| 5,707,285 | A | 1/1998 | Place et al. |
| 5,711,715 | A | 1/1998 | Ringo et al. |
| 5,718,431 | A | 2/1998 | Ornstein |

(Continued)

FOREIGN PATENT DOCUMENTS

AU    200065501    3/2001
DE    3105266      9/1982

(Continued)

OTHER PUBLICATIONS

The FrequentFlier Crier, Issurre 52, Jul. 29, 1999, http://frequentflier.com/ffc.sub.--0729.htm.
"Exciting New Online Game", InterCasino Digest, Apr. 1999.
"FrequentFlier.com—A weekly summary of travel news & opinion" (http www frequentflier com/ffc-0729 htm), Jul. 29, 1999, Issue #52.
"Harrah's courts frequent gamblers with 'total gold'", New Orleans CityBusiness, Nov. 8, 1999, Section: vol. 20, No. 20, p. 1, ISSN: 02794527.

(Continued)

Primary Examiner — Paul A D'Agostino
(74) Attorney, Agent, or Firm — Neal, Gerber & Eisenberg LLP

(57) ABSTRACT

An apparatus and method allow a value of a credit balance on a gaming device to be determined. If the value is not less than a predetermined threshold, a benefit is provided to the player of the gaming device. In various embodiments, the benefit may be, e.g., an increase in the player's credit balance.

17 Claims, 10 Drawing Sheets

(56) References Cited

U.S. PATENT DOCUMENTS

| | | |
|---|---|---|
| 5,720,662 A | 2/1998 | Holmes, Jr. et al. |
| 5,722,891 A | 3/1998 | Inoue |
| 5,732,950 A | 3/1998 | Moody |
| 5,766,074 A | 6/1998 | Cannon et al. |
| 5,769,716 A | 6/1998 | Saffari et al. |
| 5,770,533 A | 6/1998 | Franchi |
| 5,772,509 A | 6/1998 | Weiss |
| 5,775,692 A | 7/1998 | Watts et al. |
| 5,788,573 A | 8/1998 | Baerlocher et al. |
| 5,791,987 A | 8/1998 | Chen et al. |
| 5,806,855 A | 9/1998 | Cherry et al. |
| 5,807,172 A | 9/1998 | Piechowiak |
| 5,816,916 A | 10/1998 | Moody |
| 5,816,918 A | 10/1998 | Kelly et al. |
| 5,817,172 A | 10/1998 | Yamada et al. |
| 5,823,873 A | 10/1998 | Moody |
| 5,823,874 A | 10/1998 | Adams |
| 5,848,932 A | 12/1998 | Adams |
| 5,868,619 A | 2/1999 | Wood et al. |
| 5,882,105 A | 3/1999 | Barlow |
| 5,882,258 A | 3/1999 | Kelly et al. |
| 5,902,184 A | 5/1999 | Bennett |
| 5,910,048 A | 6/1999 | Feinberg |
| 5,911,418 A | 6/1999 | Adams |
| 5,934,672 A | 8/1999 | Sines et al. |
| 5,947,820 A | 9/1999 | Morro et al. |
| 5,951,397 A | 9/1999 | Dickinson |
| 5,954,335 A | 9/1999 | Moody |
| 5,967,893 A | 10/1999 | Lawrence et al. |
| 5,967,896 A | 10/1999 | Jorasch et al. |
| 5,976,016 A | 11/1999 | Moody et al. |
| 5,980,384 A | 11/1999 | Barrie |
| 5,984,310 A | 11/1999 | English |
| 5,984,781 A | 11/1999 | Sunaga |
| 5,993,316 A | 11/1999 | Coyle et al. |
| 5,997,401 A | 12/1999 | Crawford |
| 6,004,207 A | 12/1999 | Wilson, Jr. et al. |
| 6,007,066 A | 12/1999 | Moody |
| 6,007,424 A | 12/1999 | Evers et al. |
| 6,012,720 A | 1/2000 | Webb |
| 6,012,981 A | 1/2000 | Fujioka et al. |
| 6,012,983 A | 1/2000 | Walker et al. |
| 6,018,718 A | 1/2000 | Walker et al. |
| 6,032,955 A | 3/2000 | Luciano et al. |
| 6,038,552 A | 3/2000 | Fleischl et al. |
| 6,056,642 A | 5/2000 | Bennett |
| 6,062,980 A | 5/2000 | Luciano |
| 6,062,981 A | 5/2000 | Luciano, Jr. |
| 6,071,192 A | 6/2000 | Weiss |
| 6,077,163 A | 6/2000 | Walker et al. |
| 6,089,977 A | 7/2000 | Bennett |
| 6,089,978 A | 7/2000 | Adams |
| 6,089,980 A | 7/2000 | Gauselmann |
| 6,093,102 A | 7/2000 | Bennett |
| 6,098,985 A | 8/2000 | Moody |
| 6,102,400 A | 8/2000 | Scott et al. |
| 6,102,402 A | 8/2000 | Scott et al. |
| 6,105,962 A | 8/2000 | Malavazos et al. |
| 6,110,041 A | 8/2000 | Walker et al. |
| 6,113,098 A | 9/2000 | Adams |
| 6,120,378 A | 9/2000 | Moody et al. |
| 6,126,165 A | 10/2000 | Sakamoto |
| 6,126,541 A | 10/2000 | Fuchs |
| 6,126,542 A | 10/2000 | Fier |
| 6,129,632 A | 10/2000 | Luciano |
| 6,132,311 A | 10/2000 | Williams |
| 6,135,884 A | 10/2000 | Hedrick et al. |
| 6,139,431 A | 10/2000 | Walker et al. |
| 6,142,872 A | 11/2000 | Walker et al. |
| 6,142,874 A | 11/2000 | Kodachi et al. |
| 6,146,273 A * | 11/2000 | Olsen .......................... 463/27 |
| 6,149,521 A | 11/2000 | Sanduski |
| 6,155,925 A | 12/2000 | Giobbi et al. |
| 6,158,741 A | 12/2000 | Koelling |
| 6,159,095 A | 12/2000 | Frohm et al. |
| 6,159,097 A | 12/2000 | Gura |
| 6,159,098 A | 12/2000 | Slomiany et al. |
| 6,162,121 A | 12/2000 | Morro et al. |
| 6,168,520 B1 | 1/2001 | Baerlocher et al. |
| 6,168,522 B1 | 1/2001 | Walker et al. |
| 6,168,523 B1 | 1/2001 | Piechowiak et al. |
| 6,174,233 B1 | 1/2001 | Sunaga et al. |
| 6,174,235 B1 | 1/2001 | Walker et al. |
| 6,179,711 B1 | 1/2001 | Yoseloff |
| 6,186,894 B1 | 2/2001 | Mayeroff |
| 6,190,255 B1 | 2/2001 | Thomas et al. |
| 6,193,606 B1 | 2/2001 | Walker et al. |
| 6,196,547 B1 | 3/2001 | Pascal et al. |
| 6,203,429 B1 | 3/2001 | Demar et al. |
| 6,210,277 B1 | 4/2001 | Stefan |
| 6,213,877 B1 * | 4/2001 | Walker et al. .................. 463/26 |
| 6,217,022 B1 | 4/2001 | Astaneha |
| 6,217,448 B1 | 4/2001 | Olsen |
| 6,224,482 B1 | 5/2001 | Bennett |
| 6,224,483 B1 | 5/2001 | Mayeroff |
| 6,224,484 B1 | 5/2001 | Okuda et al. |
| 6,227,969 B1 | 5/2001 | Yoseloff |
| 6,227,971 B1 | 5/2001 | Weiss |
| 6,231,442 B1 | 5/2001 | Mayeroff |
| 6,231,445 B1 | 5/2001 | Acres |
| 6,234,897 B1 | 5/2001 | Frohm et al. |
| 6,238,287 B1 | 5/2001 | Komori et al. |
| 6,244,957 B1 | 6/2001 | Walker et al. |
| 6,254,482 B1 | 7/2001 | Walker et al. |
| 6,267,671 B1 | 7/2001 | Hogan |
| 6,270,409 B1 | 8/2001 | Shuster |
| 6,290,603 B1 | 9/2001 | Luciano, Jr. |
| 6,299,165 B1 | 10/2001 | Nagano |
| 6,302,790 B1 | 10/2001 | Brossard |
| 6,302,791 B1 | 10/2001 | Frohm et al. |
| 6,309,299 B1 | 10/2001 | Weiss |
| 6,312,331 B1 | 11/2001 | Tamaki |
| 6,312,334 B1 | 11/2001 | Yoseloff |
| 6,315,662 B1 | 11/2001 | Jorasch et al. |
| 6,336,862 B1 | 1/2002 | Byrne |
| 6,358,147 B1 | 3/2002 | Jaffe et al. |
| 6,368,214 B1 | 4/2002 | Luciano |
| 6,371,852 B1 | 4/2002 | Acres |
| 6,375,569 B1 | 4/2002 | Acres |
| 6,375,570 B1 | 4/2002 | Poole |
| 6,394,902 B1 | 5/2002 | Glavich et al. |
| 6,413,163 B1 | 7/2002 | Yamauchi et al. |
| 6,428,412 B1 | 8/2002 | Anderson et al. |
| 6,435,968 B1 | 8/2002 | Torango |
| 6,439,995 B1 | 8/2002 | Hughs-Baird et al. |
| 6,443,456 B1 | 9/2002 | Gajor |
| 6,450,884 B1 | 9/2002 | Seelig et al. |
| 6,468,156 B1 | 10/2002 | Hughs-Baird et al. |
| 6,491,584 B2 | 12/2002 | Graham et al. |
| 6,569,013 B1 | 5/2003 | Taylor |
| 6,577,733 B1 | 6/2003 | Charrin |
| 6,599,193 B2 | 7/2003 | Baerlocher et al. |
| 6,609,969 B1 | 8/2003 | Luciano et al. |
| 6,609,970 B1 | 8/2003 | Juciano, Jr. |
| 6,612,927 B1 | 9/2003 | Slomiany et al. |
| 6,634,942 B2 | 10/2003 | Walker et al. |
| 6,634,945 B2 | 10/2003 | Glavich et al. |
| 6,656,043 B2 | 12/2003 | Seelig et al. |
| 6,682,073 B2 | 1/2004 | Bryant et al. |
| 6,695,696 B1 | 2/2004 | Kaminkow |
| 6,702,675 B2 | 3/2004 | Poole et al. |
| 6,712,693 B1 | 3/2004 | Hettinger |
| 6,712,695 B2 | 3/2004 | Mothwurf et al. |
| 6,739,970 B2 | 5/2004 | Luciano |
| 6,746,016 B2 | 6/2004 | Perrie et al. |
| 6,758,749 B2 | 7/2004 | Krintzman |
| 6,764,396 B2 | 7/2004 | Seelig et al. |
| 6,786,824 B2 | 9/2004 | Cannon |
| 6,802,778 B1 | 10/2004 | Lemay et al. |
| 6,857,957 B2 | 2/2005 | Marks et al. |
| 6,884,167 B2 | 4/2005 | Walker et al. |
| 6,890,255 B2 | 5/2005 | Jarvis et al. |
| 6,960,133 B1 | 11/2005 | Marks et al. |
| 7,001,274 B2 | 2/2006 | Baerlocher et al. |

(56) References Cited

U.S. PATENT DOCUMENTS

| | | | |
|---|---|---|---|
| 7,014,560 B2 | 3/2006 | Glavich et al. | |
| 7,052,395 B2 | 5/2006 | Glavich et al. | |
| 7,121,943 B2 | 10/2006 | Webb et al. | |
| 7,275,990 B2* | 10/2007 | Walker et al. | 463/25 |
| 7,291,068 B2 | 11/2007 | Bryant et al. | |
| 7,318,774 B2 | 1/2008 | Bryant et al. | |
| 7,329,179 B2 | 2/2008 | Baerlocher | |
| 7,357,714 B2 | 4/2008 | Tessmer et al. | |
| 7,758,417 B2* | 7/2010 | Jorasch et al. | 463/25 |
| 7,771,271 B2* | 8/2010 | Walker et al. | 463/25 |
| 8,379,013 B2* | 2/2013 | Woo et al. | 345/419 |
| 2001/0018361 A1 | 8/2001 | Acres | |
| 2001/0038178 A1 | 11/2001 | Vancura | |
| 2001/0054794 A1 | 12/2001 | Cole et al. | |
| 2002/0049631 A1 | 4/2002 | Williams | |
| 2002/0077175 A1* | 6/2002 | Jorasch et al. | 463/25 |
| 2002/0082076 A1 | 6/2002 | Roser et al. | |
| 2002/0094863 A1 | 7/2002 | Klayh | |
| 2002/0095387 A1 | 7/2002 | Sosa et al. | |
| 2002/0137559 A1 | 9/2002 | Baerlocher | |
| 2002/0147040 A1 | 10/2002 | Walker et al. | |
| 2002/0155873 A1 | 10/2002 | Berman et al. | |
| 2002/0169021 A1 | 11/2002 | Urie et al. | |
| 2002/0179401 A1 | 12/2002 | Knox et al. | |
| 2002/0183105 A1* | 12/2002 | Cannon et al. | 463/16 |
| 2002/0187827 A1 | 12/2002 | Blankstein | |
| 2002/0193158 A1 | 12/2002 | Weiss et al. | |
| 2003/0013516 A1 | 1/2003 | Walker et al. | |
| 2003/0027623 A1 | 2/2003 | Rose | |
| 2003/0054873 A1 | 3/2003 | Peterson | |
| 2003/0060266 A1 | 3/2003 | Baerlocher | |
| 2003/0092486 A1 | 5/2003 | Cannon | |
| 2003/0093342 A1 | 5/2003 | Hillman et al. | |
| 2003/0119579 A1 | 6/2003 | Walker et al. | |
| 2003/0153383 A1 | 8/2003 | Baerlocher et al. | |
| 2003/0195031 A1 | 10/2003 | O'Donovan et al. | |
| 2003/0199313 A1 | 10/2003 | Gonen et al. | |
| 2003/0207713 A1 | 11/2003 | Taylor | |
| 2003/0216165 A1 | 11/2003 | Singer et al. | |
| 2004/0162129 A1 | 8/2004 | Nelson | |
| 2005/0029745 A1 | 2/2005 | Walker et al. | |
| 2005/0071023 A1 | 3/2005 | Gilliland et al. | |
| 2005/0090306 A1 | 4/2005 | Seelig et al. | |
| 2006/0009286 A1 | 1/2006 | Durham et al. | |
| 2006/0069619 A1 | 3/2006 | Walker et al. | |
| 2006/0154730 A1* | 7/2006 | Okuniewicz | 463/43 |
| 2006/0205480 A1 | 9/2006 | Glavich et al. | |
| 2006/0287034 A1 | 12/2006 | Englman et al. | |
| 2007/0135207 A1 | 6/2007 | Tarantino | |
| 2008/0102927 A1* | 5/2008 | Mayeroff | 463/20 |
| 2009/0054127 A1* | 2/2009 | Sweary et al. | 463/16 |
| 2009/0318223 A1* | 12/2009 | Langridge et al. | 463/31 |
| 2010/0016082 A1* | 1/2010 | Prochnow | 463/42 |
| 2011/0105220 A1* | 5/2011 | Hill et al. | 463/29 |
| 2011/0306401 A1* | 12/2011 | Nguyen | 463/20 |

FOREIGN PATENT DOCUMENTS

| | | |
|---|---|---|
| EP | 0 558 307 | 2/1993 |
| EP | 753 331 | 1/1997 |
| EP | 874 337 | 10/1998 |
| EP | 0945837 | 3/1999 |
| EP | 945 837 | 9/1999 |
| EP | 0 981 119 | 2/2000 |
| EP | 0 984 407 | 3/2000 |
| EP | 989 531 | 3/2000 |
| EP | 1 076 321 | 2/2001 |
| EP | 1 195 730 | 4/2002 |
| GB | 970 806 | 9/1964 |
| GB | 2 137 392 | 10/1984 |
| GB | 2 292 245 | 2/1996 |
| GB | 2 322 217 | 8/1998 |
| WO | WO 85/00910 | 2/1985 |
| WO | WO 98/00207 | 1/1998 |
| WO | WO 99/03078 | 1/1999 |

OTHER PUBLICATIONS

Stratton, David, "Join the Club; casinos start 'slot clubs'", Travel Agent, Sep. 10, 2001, Section: No. 7, vol. 1 305, p. 95, 1053-9360.

Website: "First National Bank and Trust—Personal", (http www agbank com/personal cfm), download date: Aug. 6, 2003.

Office Action for U.S. Appl. No. 11/428,484, dated Aug. 14, 2008, 8pp.

Office Action for U.S. Appl. No. 11/428,488, dated Sep. 3, 2008, 8pp.

"A Salute to Game Shows," The Price is Right—Pricing Games, printed from schuminweb.com/game-shows/shows/price-is-right/pricing-games.htm on Mar. 16, 2001.

Bunco History and Rules, printed from http://world-bunco.com/history.html on May 22, 2000.

Creepy and Kooky Article, written by Frank Legato, published by Strictly Slots in Jul. 2000, pp. 52-54.

Jackpot Party Advertisement on website page http://www.wmsgaming.com/products/slot/jpp/index.html, printed on Mar. 21, 2001.

Jackpot Party Brochures and Articles written by WMS Gaming, Inc., published in Mar. 1998.

Jeopardy Advertisement written by IGT, published in 2000.

Jeopardy Video Slots advertisement written by IGT, published in 2000.

Jeopardy, MegaJackpots Advertisement written by IGT, published in 1998.

Monopoly Blackjack Edition Game described in Mikohn brochure, published in 2000.

Multi-Action Blackjack brochure, http://conjelco.com/faq/bj.html, printed on Jul. 30, 2001.

Multi-Play Poker by Bally Gaming, described in Strictly Slots, published in Dec. 2000.

Multi-Play Poker by Bally Gaming, printed from ballygaming.com/products/multi-play-poker.html on Apr. 25, 2001.

Play It Again Poker Brochure, written by IGT, published in 1999.

Power Slotto Brochure published by AC Coin & Slot prior to 2002.

Slot Machines, A Pictorial History of the First 100 Years, written by Marshall fey, published by Liberty Belle Books, 1983-1997.

Super Bonus Poker by Bally Gaming, described in Strictly Slots, published in Apr. 2000.

Totem Pole Advertisement, written by IGT, published in 1997.

Wheel of Madness Game, described in AC Coin & Slot brochure, published in 2000.

Non-Final Office Action for U.S. Appl. No. 11/554,489 dated Dec. 22, 2009.

\* cited by examiner

| LOGGED EVENT 410 | AMOUNT CREDITED OR DEBITED 415 | RESULTING CREDIT BALANCE 420 | RESULTING BALANCE IS 120 COINS OR MORE? 425 | BALANCE RISES ABOVE 130 COINS? 430 | $10 BILL INSERTED? 440 |
|---|---|---|---|---|---|
| PLAYER INSERTS $20 BILL INTO BILL ACCEPTOR | + 80 COINS | 80 COINS | NO | NO | NO |
| BONUS FOR INSERTING $20 BILL | + 5 COINS | 85 COINS | NO | NO | NO |
| PLAYER INSERTS $10 BILL INTO BILL ACCEPTOR | + 40 COINS | 125 COINS | YES | NO | YES |
| FREE SPIN FOR INSERTING $10 BILL, LOSS | NONE | 125 COINS | YES | NO | NO |
| PLAYER BETS 3 COINS ON GAME, LOSES | - 3 COINS | 122 COINS | YES | NO | NO |
| PLAYER BETS 3 COINS ON GAME, LOSES | - 3 COINS | 119 COINS | NO | NO | NO |
| PLAYER BETS 3 COINS ON GAME | - 3 COINS | 116 COINS | NO | NO | NO |
| PAYOUT - REELS SHOW CHERRY-ORANGE-BAR | + 2 COINS | 118 COINS | NO | NO | NO |
| PLAYER BETS 3 COINS ON GAME | - 3 COINS | 115 COINS | NO | NO | NO |
| PAYOUT - REELS SHOW CHERRY-BAR-CHERRY | + 5 COINS | 120 COINS | YES | NO | NO |
| PLAYER BETS 1 COIN ON GAME, LOSES | - 1 COIN | 119 COINS | NO | NO | NO |
| PLAYER BETS 1 COIN ON GAME, LOSES | - 1 COIN | 118 COINS | NO | NO | NO |

FIG. 4A

| LOGGED EVENT 410 | AMOUNT CREDITED OR DEBITED 415 | RESULTING CREDIT BALANCE 420 | RESULTING BALANCE IS 120 COINS OR MORE? 425 | BALANCE RISES ABOVE 130 COINS? 430 | $10 BILL INSERTED? 440 |
|---|---|---|---|---|---|
| PLAYER BETS 3 COINS ON GAME, LOSES | -3 COINS | 115 COINS | NO | NO | NO |
| PLAYER INSERTS $1 BILL INTO BILL ACCEPTOR | +4 COINS | 119 COINS | NO | NO | NO |
| PLAYER INSERTS $1 BILL INTO BILL ACCEPTOR | +4 COINS | 123 COINS | YES | NO | NO |
| PLAYER INSERTS $1 BILL INTO BILL ACCEPTOR | +4 COINS | 127 COINS | YES | NO | NO |
| PLAYER INSERTS $1 BILL INTO BILL ACCEPTOR | +4 COINS | 131 COINS | YES | YES | NO |
| BONUS FOR BALANCE RISING ABOVE 130 COINS | +2 COINS | 133 COINS | YES | NO | NO |
| PLAYER BETS 2 COINS ON GAME, LOSES | -2 COINS | 131 COINS | YES | NO | NO |
| PLAYER BETS 3 COINS ON GAME, LOSES | -3 COINS | 128 COINS | YES | NO | NO |
| PLAYER BETS 3 COINS ON GAME | -3 COINS | 125 COINS | YES | NO | NO |
| PAYOUT - REELS SHOW CHERRY-ORANGE-CHERRY | +7 COINS | 132 COINS | YES | YES | NO |
| BONUS FOR BALANCE RISING ABOVE 130 COINS | +2 COINS | 134 COINS | YES | NO | NO |
| PLAYER BETS 3 COINS ON GAME, LOSES | -3 COINS | 131 COINS | YES | NO | NO |

| BENEFIT IDENTIFIER 510 | CONDITION FOR PROVIDING BENEFIT 520 | DESCRIPTION OF BENEFIT 530 |
|---|---|---|
| BEN-3818068-01 | (CREDIT_BALANCE >= 120 COINS) | MODIFIED PAYOUT TABLE |
| BEN-3818068-02 | CREDIT BALANCE RISES ABOVE 130 COINS | FREE SPIN OF REELS ON SLOT MACHINE |
| BEN-3818068-03 | $10 BILL INSERTED INTO BILL ACCEPTOR | 2 COINS ADDED TO CREDIT BALANCE |
| BEN-3818068-04 | CREDIT BALANCE IS GREATER THAN 50 COINS AND A PLAYER WINS A 7-7-7 JACKPOT | ELECTRIC SCOOTER |
| BEN-3818068-05 | (CREDIT_BALANCE > $40) AND (BILL_INSERTED) | FREE DINNER FOR TWO AT CACTUS CLUB RESTAURANT |
| BEN-3818068-06 | A FRIEND OF PLAYER MAINTAINS A CREDIT BALANCE OF MORE THAN 100 COINS | PAYOUT FOR A BAR-BAR-BAR JACKPOT IS DOUBLED |

| INDICATION IDENTIFIER 710 | CONDITION FOR PROVIDING INDICATION 720 | INDICATION TO BE PROVIDED 730 |
|---|---|---|
| IND-081234498-01 | CREDIT BALANCE FALLS BELOW 120 COINS | "YOUR BALANCE IS NOW LESS THAN 120 COINS, SO YOU NO LONGER QUALIFY FOR THE MODIFIED PAYOUT TABLE. TO INCREASE YOUR BALANCE AND GET INCREASED PAYOUTS, INSERT MORE MONEY." |
| IND-081234498-02 | CREDIT BALANCE IS LESS THAN 130 COINS | "IF YOU INCREASE YOUR CREDIT BALANCE TO MORE THAN 130 COINS, YOU GET A FREE SPIN" |
| IND-081234498-03 | $10 BILL INSERTED INTO BILL ACCEPTOR | "IF YOU INSERT ANOTHER $10, YOU'LL GET 3 MORE COINS AS A BONUS" |
| IND-081234498-04 | CREDIT BALANCE IS GREATER THAN 50 COINS AND A PLAYER WINS A 7-7-7 JACKPOT | "YOU CAN GET A BONUS OF 20 COINS IF YOU MAINTAIN A BALANCE OF MORE THAN 200 COINS FOR 80 GAMES" |
| IND-081234498-05 | (CREDIT_BALANCE > $40) AND (BILL_INSERTED) | "IF YOU INCREASE YOUR BALANCE TO $80, THEN YOU GET 5 FREE JACKPOT-ONLY SPINS" |
| IND-081234498-06 | A FRIEND OF PLAYER INCREASES A CREDIT BALANCE TO MORE THAN 100 COINS | "YOUR FRIEND JUST INCREASED HIS CREDIT BALANCE TO MORE THAN 100 COINS. IF HE KEEPS IT AT THIS LEVEL, YOU GET DOUBLE JACKPOTS" |

FIG. 7

METHOD AND APPARATUS FOR PROVIDING A BONUS TO A PLAYER BASED ON A CREDIT BALANCE

PRIORITY CLAIM

This application is a continuation of, claims priority to and the benefit of U.S. patent application Ser. No. 13/911,761, filed on Jun. 6, 2013, which is a continuation of, claims priority to and the benefit of U.S. patent application Ser. No. 10/419,306, filed on Apr. 18, 2003, which claims priority to and the benefit of U.S. Provisional Patent Application No. 60/373,749, filed on Apr. 18, 2002, the entire contents of which are each incorporated by reference herein.

CROSS REFERENCE TO RELATED APPLICATIONS

This application relates to the following commonly owned patent applications: "METHOD AND APPARATUS FOR PROVIDING A BONUS TO A PLAYER BASED ON A CREDIT BALANCE BONUS," Ser. No. 13/936,719.

FIELD OF THE INVENTION

This invention relates generally to electronic game machines and more particularly, to a system and method for motivating additional game play by providing a benefit to a player for maintaining a high credit balance.

BACKGROUND

A primary goal of a casino is to keep its customers playing as long as possible since longer play generates higher revenues. Casinos are thus interested in maintaining player interest and excitement. When a player's credit balance on a game machine is reduced to zero, the player will often stop playing the game machine. Casinos would prefer that a player not reduce his credit balance to zero and stop gambling. There are several ways in which casinos currently attempt to motivate players to continue gambling, such as by building entertaining games that have large jackpots and favorable payout tables. Another way casinos currently attempt to motivate players to continue gambling is to provide comp points and other benefits to a player for placing bets at a game machine.

DESCRIPTION OF THE DRAWINGS

FIGS. 4A and 4B illustrate a sample table from a session log database stored in a data storage device in accordance with one embodiment of the present invention;

FIG. 5 illustrates a sample table from a benefit database stored in a data storage device in accordance with an embodiment of the present invention;

FIG. 7 illustrates a sample indication table from an indication database stored in a data storage device in accordance with an embodiment of the present invention;

DETAILED DESCRIPTION

Introduction

Systems and methods according to the present invention allow a game machine owner, such as a casino, to provide various benefits to players to motivate them to maintain higher credit balances on a game machine. In such a system, one or more game machines are connected to a controller. After a player begins playing on a game machine, the controller will determine certain conditions present with respect to that game machine and that player's game session. The controller will then provide a benefit or an indication that a benefit will be provided if the credit balance is increased, such as a video message, that a benefit will be provided to the player based on the presence of certain conditions.

Figure 1:
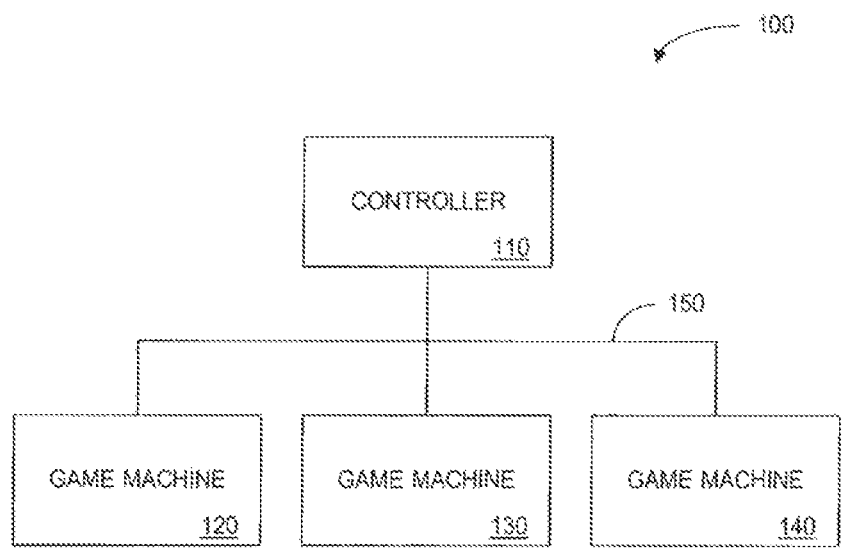
FIG. 1 is a block diagram illustrating an example system according to one embodiment of the invention.

FIG. 1 shows an illustrative game machine network 100 for the exchange of information between one or more game machines 120-140 and a controller 110. According to a feature of the invention, controller 110 determines the presence of a condition on one or more game machines 120-140, and provides a benefit to the player based on the presence of the condition. According to another feature of the invention, controller 110 determines the presence of a condition on one or more of game machines 120-140 and provides an indication to a player based on the presence of the condition. It will be readily understood by those of skill in the art that the functions described herein as performed by the controller 110 may additionally or alternatively be performed by one or more game machines, and vice versa.

Game machine network 100 includes controller 110 networked via a communications network 150 to game machines 120-140. Although FIG. 1. only shows an exemplary network of three game machines, any number of game machines may be in connection with controller 110.

As used herein the term "game machine" is defined to include a terminal that a player uses to play a game of chance. Game machines 120-140 may comprise conventional game machines modified to carry out the functions and operations contemplated by embodiments of the invention and described below. Examples of game machines 120-140 include but are not limited to: a slot machine, a video poker terminal, a pachinko machine, a table-top game, a personal computer, a telephone, and a portable handheld gaming device. In embodiments of the invention addressing table game play such as blackjack, craps, roulette, baccarat, Keno, Bingo, and the like, the game machine may be hardware located at the game table suitable for entering player identifiers or average bet sizes.

Figure 3:
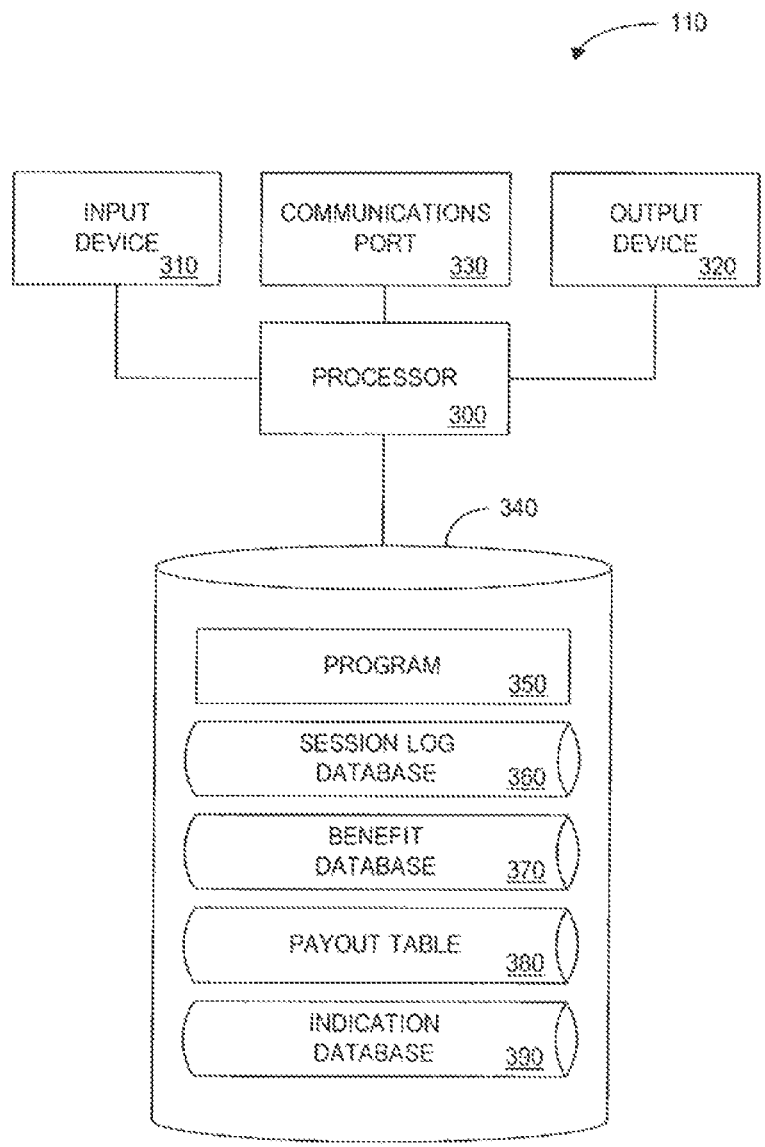
FIG. 3 is a schematic block diagram of a controller in accordance with one embodiment of the present invention.

The term "controller" is defined to include a computer system operated by the casino, which may communicate with one or more game machines 120-140. Controller 110 is depicted in FIG. 3. Controller 110 may be embodied as a server which comprises conventional server computer hardware, such as an RS 6000 manufactured by IBM Corp. Controller 110 may also be a computer which comprises general computer hardware. Controller 110 executes software instructing the hardware to execute unique functions and operations in accordance with the principles of the present invention. Controller 110 and game machines 120-140 exchange digitally encoded data messages to one another through communication network 150.

Communication network 150 facilitates exchanges of data between game machines 120-140 and controller 110. Game machine network 100 may include one or more communication networks, such as communication network 150, to allow one or more of the following exchanges of data to occur: 1) the controller 110 may transmit information to game machine 120, 130, or 140; and 2) game machine 120-140 may transmit information to controller 110. Possible communication networks 150 include but are not limited to: a local area network (LAN), a wide area network (WAN), the Internet, a telephone line or a cable line, a radio channel, an optical communications line, or a satellite communications link. Possible communications protocols include Ethernet, Bluetooth, and TCP/IP. Furthermore, the exchanges of data may be encrypted to ensure privacy and prevent fraud.

Figure 2:
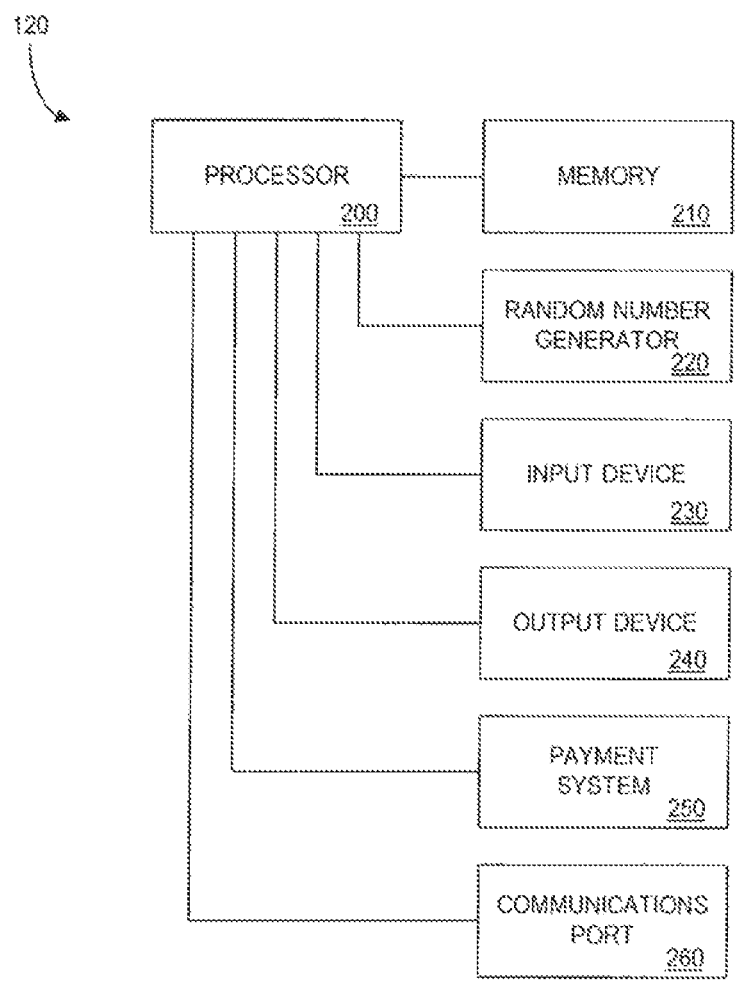
FIG. 2 is a block diagram of a game machine in accordance with one embodiment of the present invention.

FIG. 2 is a block diagram showing the architecture of an illustrative game machine 120, 130, or 140 as indicated in FIG. 1 and provided in accordance with the present invention. As shown in FIG. 2, game devices 120-140 include processor 200, which is connected to memory 210, random number generator 220, input device 230, output device 240, payment system 250, and communications port 260. These components and their arrangement may be conventional, though they may be, e.g., programmed appropriately to perform the methods described herein. Communication port 260 provides a connection for linking game machine 120, 130, or 140 to controller 110. Processor 200 communicates with controller 110 through communications port 260. Communications port 260 is in communication with controller 110 through communications network 150.

Output device 240 is a device that may be used to output information from game machine 120-140 to a player. Examples of output device 240 include but are not limited to: a video monitor, a light-emitting diode (LED), an audio speaker, an electric motor, a printer, a coupon or product dispenser, an infra-red port, a Braille computer monitor, a coin or bill dispenser. For game machines, common output devices include: a cathode ray tube (CRT) monitor on a video poker machine; a bell on a slot machine; a light emitting diode (LED) display of a player's credit balance on a slot machine; a liquid crystal display (LCD) of a personal digital assistant (PDA) for displaying keno numbers; and a printer to provide a cashless gaming receipt for a player's gambling credits.

Input device 230 is a device that may be used to receive an input from a player. Examples of input device 230 include but are not limited to: a computer keyboard, a computer mouse, a touch screen, a microphone, a video camera, a magnetic stripe reader, a biometric input device, a radio antenna, a voice recognition module, a coin or bill acceptor. For game machines, common input devices include: a button or touch screen on a video poker machine; a lever on a slot machine; a bill validator/acceptor; a magnetic stripe reader to read a player tracking card inserted into a slot machine.

Game machine 120-140 may include payment system 250 that performs at least two main functions: 1) accepting payment from a player; and 2) providing payment to a player. Payment is not limited to money but may also include other types of consideration, including but not limited to products, services, and alternate currencies such as casino chips. Exemplary methods of accepting payment from a player include: 1) receiving hard currency; 2) receiving an alternate currency such as a paper gaming voucher, a coupon, or a casino token; 3) receiving a payment identifier such as a credit card number, a debit card number, or a player tracking card number; and 4) determining that a player has performed a value-added activity, such as answering survey questions. Exemplary methods of providing payment to a player include: 1) dispensing hard currency; 2) dispensing an alternate currency such as a paper gaming voucher, a coupon, or a casino token; 3) crediting a player account such as a bank account or other financial account; and 4) providing a product or service to the player such as a jackpot prize.

With respect to gaming operations, game machines 120-140 may generally operate in a conventional manner. The player starts the machine by inputting a payment into payment system 250 or into input device 230, such as inserting a coin, or using an electronic credit. Under control of a program stored, for example in memory 210, processor 200 initiates the particular game. In the alternative, processor 200 may operate the particular game under control of a program stored in controller 110. Processor 200 may communicate with controller 110 through communications port 260. In running the game, processor 200 may instruct random number generator 220 to generate a number which will affect the particular game operating on game machine 120-140. As the game is operated, processor 200 may output information through output device 240 in accordance with the instructions in memory 210 or controller 110. Processor 200 determines outcome of the play and may provide a payment through payment system 250 depending on the outcome of the play. Processor 200 may then provide information regarding the game session to controller 110 through communications port 260. Communications port 260 is in communication with controller 110 through communications network 150.

A player may operate multiple gaming machines 120-140. For example: a player may simultaneously play two side-by-side game machines; a player may play a reel game machine and then continue his gambling session at a video poker machine. A player may also use a telephone or other device to remotely operate a game machine. In an alternate embodiment, a game machine may allow a player to play a game of skill rather than a game of chance.

FIG. 3 is a block diagram of controller 110 as indicated in FIG. 1 and provided in accordance with the present invention. Controller 110 is a computer system which may communicate with one or more game machines 120-140. Controller 110 includes certain standard hardware components, such as processor 200, a clock (not shown), Read Only Memory (ROM) (not shown), Random Access Memory (RAM) (not shown), communications port 330, storage device 340, input device 310, and output device 320. Processor 200 may be embodied as a single processor, or a number of processors. Processor 200 may exchange data with the iterated components either by means of a shared bus, or dedicated connections. Communications port 330 connects controller 110 to game machines 120, 130, and 140, via communications network 150.

Unlike conventional computer systems, controller 110 executes one or more programs 350 to perform the functions contemplated by embodiments of the invention as described below and stores several databases (360, 370, 380, and 390) relating to those functions and operations. The programs and databases are stored in storage device 340. These databases include session log database 360, benefit database 370, payout table 380, and indication database 390.

Session log database 360 provides a repository of events that took place on game machine 120-140 during individual playing session. FIGS. 4A and 4B show a possible organization of session log database 360. Session log database 360 maintains a plurality of records, such as records 445-448, each associated with a different game session. For each session by a logged event 410, session log database 360 includes:

(1) amount credited or debited field 415; (2) resulting credit balance field 420; (3) whether the resulting balance is 120 coins or more field 425; (4) whether the balance rises above 130 coins field 430; and (5) whether a $10 bill was inserted field 440. The above are examples of conditions that may be present and which would allow a player to receive a benefit. For example, with respect to field 425 (whether the resulting balance is 120 coins or more), a player may receive a benefit if his credit balance is greater than or equal to 120 coins. The data stored in session log database 360 is used with the methods contemplated by embodiments of this invention and described below.

According to one embodiment, information about a credit balance or changes in a credit balance such as field 415 (amount credited or debited) and field 420 (resulting credit balance) may be stored in session log database 360. As illustrated in record 445 and record 446, a player inserted a $20 bill into a game machine and then received a bonus of 5 coins for inserting this $20 bill.

Each time a debit or credit is made to a credit balance, this change may be recorded in session log database 360. Field 420 (resulting credit balance) keeps track of the credit balance that results from each event. As is shown in record 447 and field 415 (amount credited or debited for record 447), a credit of 40 coins was added to a credit balance. This value may be added to field 420 (resulting credit balance) from the previous record 445 to determine the resulting credit balance field 420 for when the player inserts a $10 bill into the bill acceptor, field 447.

Session log database 360 may also store indications of whether conditions are true. These conditions may be based on, but are not limited to, the following: 1) a current credit balance on a game machine; 2) decreases in a credit balance; 3) increases in a credit balance; 4) historical values of a credit balance and 5) various average balances. For example, fields 425, 430, and 440 indicate whether a particular condition is true or false for any particular logged event.

Benefit database 370, provides a table of information concerning benefits that may be provided to a player based upon certain conditions. The data stored in benefit database 370 may be useful in determining a benefit based on a condition relating to a credit balance on game machine 120-140. Benefit database 370 may be used to track conditions that may be present during a game session and determine what benefit to provide if a condition is true. FIG. 5 shows a possible organization of benefit database 370. Benefit database 370 maintains a plurality of records, such as records 540-560 each associated with a benefit. For each benefit identified by benefit identifier 510, benefit database 370 includes: the condition for providing a benefit 520, and the description of the benefit 530. The benefit identifier 510 is a unique assigned key that can be used to refer to the particular benefit throughout the system. The "Condition for providing benefit" column 520 lists the particular condition under which a particular benefit will be provided. A variety of different types of conditions are possible, based on but not limited to the following: 1) a current credit balance on a game machine; 2) decreases in a credit balance; 3) increases in a credit balance; 4) historical values of a credit balance; and 5) various average balances. Furthermore, the conditions may be stored in the condition benefit database 370 in a variety of different formats. These will be further discussed below. A benefit may be selected to be output to a player if the condition corresponding to that benefit is true. For example, as shown in FIG. 5 if a player inserts a $10 bill into a bill acceptor, field 520 for record 560, then the player may receive a benefit of 2 coins added to his credit balance as indicated by field 530 for record 560.

Figure 6:
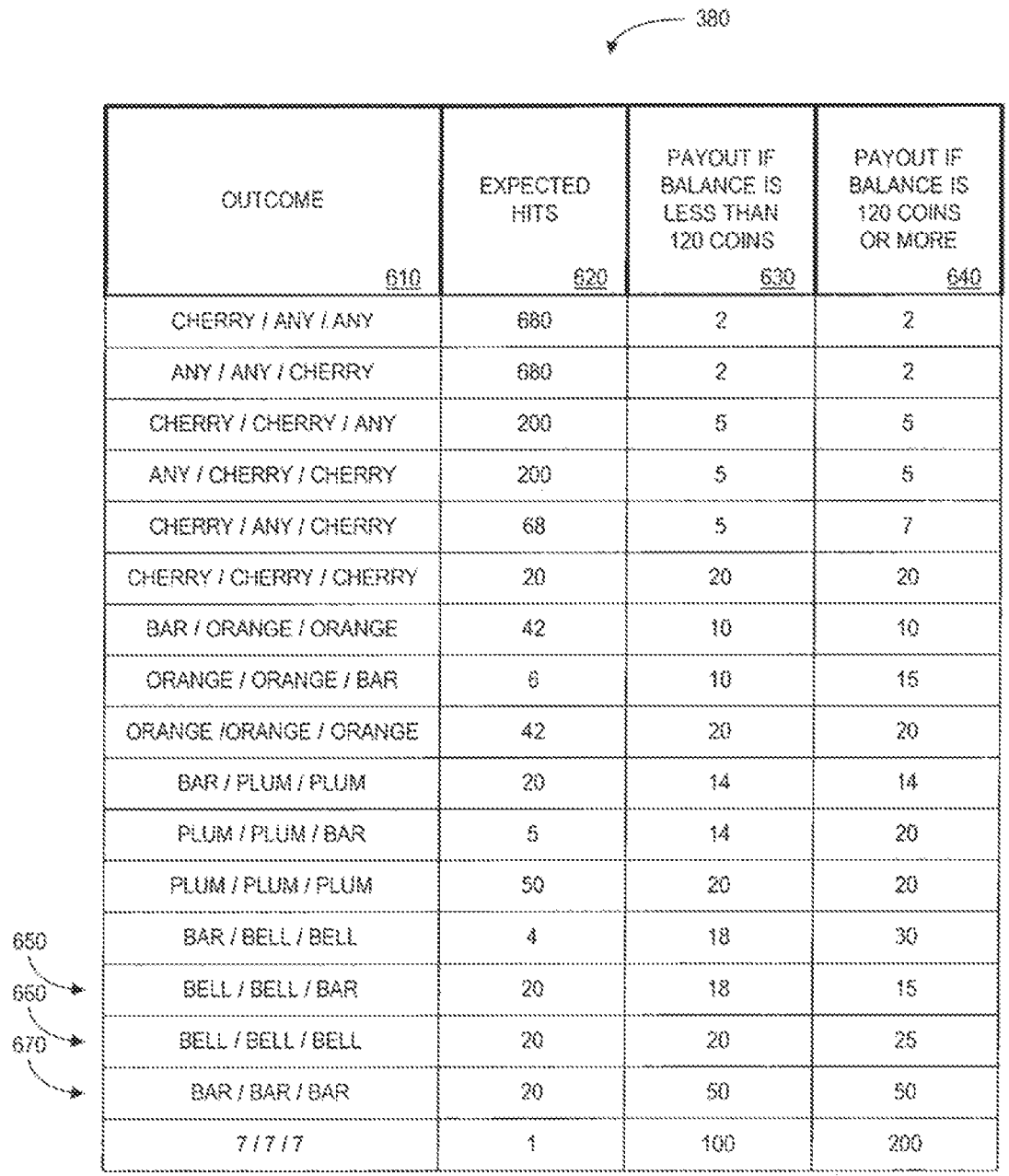
FIG. 6 illustrates a sample payout table stored in a data storage device in accordance with an embodiment of the present invention.

Payout table 380 provides a table of payouts should a certain outcome be determined. FIG. 6 shows a possible organization of payout table 380. Payout table 380 is a database which maintains a plurality of records, such as records 650-670, each associated with a different possible game result. For each possible game result identified in outcome field 610, payout table 380 includes an indication of the expected number of hits for the outcome 620; an indication of a payout that may be provided if the outcome occurs and a credit balance is less than 120 coins 630; and an indication of a payout that may be provided if the outcome occurs and a credit balance is 120 coins or more 640. Most payout values will be increased as the credit balance is adjusted from less than 120 coins to more than 120 coins, though it is also possible that one or more payout values could decrease. For example, the BELL/BELL/BAR record 650 value decreases slightly if a player has a credit balance of greater than 120 coins as is shown in field 640 (payout if balance is 120 coins or more) for record 650. The revised payout table, (particularly field 640) may be made available to a player as a benefit for having a particular condition satisfied, i.e. more than 120 coins or more in the above example.

Indication Database 390 stores information which may be useful in determining an indication to output to a player based on a condition relating to a credit balance on game machine 120-140. FIG. 7 shows a possible organization of indication database 390. Indication database 390 maintains a plurality of records, such as records 740-760 each associated with a different indication. For each indication identified by an indication identifier in field 710, indication database 390 includes: a condition for outputting the condition 720 and the indication to be provided 730. The data stored in indication database 390 may be useful in determining an indication to provide a player based on a condition relating to the credit balance on game machine 120-140. Indication Identifier 710 is a unique assigned key that can be used to refer to the particular indication throughout the system.

"Condition for providing indication" column 720 lists the particular condition under which a particular indication will be provided. Conditions may be based on a variety of different factors including but not limited to: 1) a current credit balance on a game machine; 2) decreases in a credit balance; 3) increases in a credit balance; 4) historical values of a credit balance; and 5) various average balances. Furthermore, conditions may be stored in a variety of different forms which will be further discussed below. An indication may be selected to be output if a condition is true. For example, as shown in FIG. 7, if a players credit balance falls below 120 coins, the player will be provided with an indication that "your balance is now less than 120 coins, so you no longer qualify for the modified payout table. To increase your balance and get increased payouts, insert more money."

The operation of game machine network 100 will be described with respect to two different aspects. First, game network 100 operates to motivate a player to achieve and/or maintain higher balances. Second, game machine network 100 operates to provide a player with an indication that a benefit may be provided if the credit balance is increased. These operations may occur concurrently to provide benefits and indications of benefits.

The operation of game network 100 will be described with respect to two different aspects. First, game network 100 operates to provide a player with a benefit. Second, game network 100 operates to provide a player with an indication of a benefit. These operations may occur concurrently to provide benefits and indications.

Figure 8:
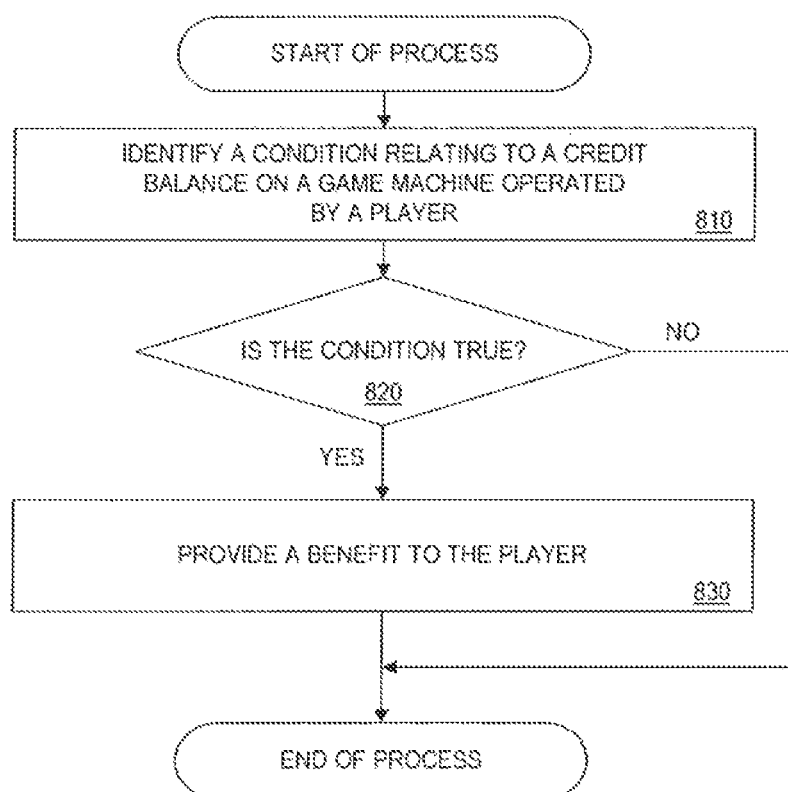
FIG. 8 is a flow-chart depicting a method of providing a benefit to a player based on a condition in accordance with an embodiment of the present invention.

According to one embodiment of the invention, a player receives a benefit based on a condition relating to a credit balance on a game machine. This embodiment of the invention identifies a condition relating to a credit balance on a game machine and provides a benefit based on the condition. FIG. 8 is a flow diagram representing a method implementing one embodiment of the invention. As shown in FIG. 8, the controller 110 must first identify a condition relating to a credit balance on a game machine operated by a player (step 810); then the controller 110 determines if the condition is true (step 820). If the condition is true, the controller 110 will provide the benefit associated with the condition (step 830). Alternatively, the game machine 120, 130, 140 may perform some or all of the steps performed by controller 110 alone or in communication with controller 110.

The system identifies a condition relating to a credit balance on a game machine operated by a player (step 810). This step involves first identifying a credit balance and next identifying a condition. The credit balance can be measured in a variety of ways including but not limited to: 1) a number of coins; 2) an amount of an alternate currency; and 3) an amount of money. According to one embodiment of the invention, the controller 110 may identify at least one credit balance on at least one game machine 120, 130, or 140. In another embodiment of the invention: a player may simultaneously operate two game machines, and thereby two credit balances, one on each machine. The controller 110 identifies the two credit balances. In yet another embodiment of the invention, a single game machine 120, 130140 may have two associated credit balances which controller 110 identifies. For example, game machine 120, 130, or 140 may store a first credit balance corresponding to money that a player has inserted into the game machine and a second credit balance corresponding to promotional credits that have been provided to the player. In another embodiment of the invention, two or more game machines 120-130 may share a single credit balance which controller 110 identifies. For example, a husband and wife may share a single credit balance that is stored in database 340 at controller 110. The husband may operate a first game machine that debits wager amounts from the credit balance, and the wife may operate a second game machine that debits wager amounts from the credit balance. Prizes won by either the husband or the wife may be credited to the credit balance. In an alternative embodiment, a player's credit balance on a game machine, which controller 110 identifies, may be linked or merged with a financial account belonging to the player such as, a bank account, a debit card account, a credit card account. In yet another alternate embodiment, controller 110 may not identify a credit balance on a game machine. For example, it is possible to determine that a credit balance has increased by $10 without knowing the value of the credit balance before or after the event. The credit balance may be stored in session log database 360.

According to step 810, in addition to identifying the credit balance, controller 110 also identifies a condition. Conditions may be based on a variety of different factors including but not limited to whether current credit balance is: 1) greater than a certain value; 2) less than a certain value; 3) equal to a certain value; or 4) within a range of values.

Alternatively, a condition may be based on a change in credit balance including: 1) a credit balance decreases by a certain amount; 2) a credit balance falls below a certain value; 3) a player "cashes out" or withdraws at least a portion of a credit balance; 4) a player is penalized, causing his credit balance to decrease; or 5) a linked or merged credit balance or other financial account may be unlinked or otherwise removed such as removing a link between a credit card balance on a game machine and a credit card account.

A condition may also be based on an increase in a credit balance such as: 1) a credit balance increases by a certain amount, e.g., from a payout; 2) a credit balance rises above a certain value; 3) a player inserts currency into a game machine; 4) a player increases his credit balance by accepting a subsidy offer; 5) a credit balance is linked or merged with a second credit balance or a financial account such as agreeing to merge his credit balance with a credit balance of a second player on a second game machine or a player linking his credit balance on a game machine with his credit card account.

A condition may also be based on historical values of a credit balance such as whether: 1) a credit balance has been greater than a certain value for a specified duration; 2) a credit balance has been less than a certain value for a specified duration; 3) an average credit balance is greater than a certain value; 4) an average credit balance is less than a certain value; 5) differences between various credit balances. A duration may be specified in a variety of ways. One way a duration may be specified is by time. For example, a condition may be that a credit balance has been greater than 100 credits for the past 1.5 hours. Another way a duration may be specified is by number of games. For example, a condition may be that an average credit balance over the prior 80 handle pulls (plays) is greater than $20. Another way a duration may be specified is by bounding the duration by at least one event such as a jackpot or other outcome. For example, a condition may be that a credit balance has been more than 200 credits since the player last won a jackpot. In a second example, a condition may be that an average credit balance since a player last won a jackpot is greater than 100 tokens.

According to one embodiment of the invention, controller 110 may identify a plurality of conditions. For example: 1) a player may receive a benefit if a credit balance is greater than 100 credits (a first condition) and the player inserts a $20 bill into a game machine (a second condition); and 2) a player may receive a benefit if a credit balance rises above 120 coins (a first condition) and the credit balance has been less than 120 credits for the last 1 hour (a second condition).

After identifying the credit balance and the condition relating to the credit balance, the controller 110 may determine whether a condition is true (step 820). The following is a description of a variety of ways that the controller 110 may determine whether a condition is true.

According to one embodiment of the invention, the controller 110 may determine that a condition is true by evaluating a Boolean expression. This Boolean expression may, e.g., reference one or more variables and may include Boolean modifiers and conjunctions (e.g. AND, OR, XOR, NOT, NAND), comparators (e.g., $>$, $<$, $=$, $>=$, $<=$, $!=$), mathematical operations (e.g. $+$, $-$, $*$, $/$, mean, standard deviation, logarithm, derivative, integral), and constants (e.g. $10, 20 coins, 300 credits, 0.02, 15%, pi, TRUE, yellow, "raining"). Examples of Boolean expressions include:
1) (credit_balance>=100);
2) (credit_balance>=120) AND (credit_balance<=200);
3) (change_in_credit_balance>1) AND (credit_balance>300);
4) (previous_credit_balance<200) AND (new_credit_balance>=200);
5) (credit_balance>200) AND (NOT (minimum_balance_last_hour<100)); and
6) (average_balance_entire_session>100) OR average_balance_last_50_games>200).

According to another embodiment of the invention, controller 110 may compare a credit balance to at least one threshold value. For example, if a credit balance is greater than 100 coins, then a player may receive a benefit.

Lastly, controller 110 may provide a benefit to a player based on the condition (step 830). Step 830 includes first determining which benefit to provide and then providing the benefit. Controller 110 can determine which benefit to provide by using information located in benefit database 370 as shown in FIG. 5. For example, record 560, BEN-38-18068-03, indicates that 2 coins will be added to the credit balance if a $10 bill is inserted into the bill acceptor. Alternatively, controller 110 may provide a set of benefits to the player if a condition is fulfilled. The player can then select the particular benefit by inputting his selection through input device 230. Once the benefit has been determined, controller 110 will provide the benefit to the player. In addition, controller 110 may notify the player of the benefit by providing notification through output device 240. In one embodiment, this would include providing payment through payment system 250.

According to one embodiment, the step of determining a benefit may also be based on one or more additional factors or conditions. While a wide variety of factors are possible, some examples of additional factors include: 1) factors relating to the player's gambling activities; 2) factors relating to the player's visit to a casino; 3) factors relating to the player's other activities; 4) factors relating to benefits that have been provided; 5) factors relating to other players. Examples of factors relating to the player's gambling activities include: 1) the player's past gambling activities; 2) the player's present gambling activities; 3) the player's anticipated future gambling activities; 4) metrics of the player's gambling activities; and 5) the player's preferences. Examples of factors relating to the player's visit to the casino include: 1) people who accompanied the player to the casino; 2) whether the player has reserved a hotel room at the casino; 3) purchases made by the player at the casino; and 4) the duration of the player's visit to the casino. Examples of factors relating to other activities performed by a player: 1) complimentary products or services received by the player; 2) subsidy offers accepted or rejected by the player. For example, a total dollar value of benefits that a player has received. According to one embodiment, there may be a limit on a value of benefits that a player may receive. Factors relating to the other players are similar to the factors listed above. Examples of other players associated with the player include: 1) a player who is operating a nearby slot machine; 2) a player who is sharing a room with the player; 3) a player who arrived on the same bus as the player; 4) family members, friends, and other associates of the player.

According to one embodiment, the controller 110 may receive information about factors from a variety of sources, including: 1) game machines and their associated input devices; 2) input devices; 3) casino employees; 4) databases accessible by the controller 110. In another embodiment, the controller 110 may receive indications from one or more game machines operated by the player, as well as from game machines operated by other players.

Once controller 110 determines which benefit is associated with a particular condition, controller 110 will provide the benefit to the player. Various types of benefits may be provided to the player including but not limited to: 1) benefits relating to payouts; 2) benefits relating to probabilities of game outcomes; 3) game advantages; 4) money; 5) financial benefits; 6) benefits relating to a cost per wager; 7) complimentary awards; 8) merchandise; 9) non-negotiable tokens; 10) discounts; 11) entertainment; 12) services; 13) benefits to a party associated with a player.

Examples of benefits relating to payouts include but are not limited to: 1) top jackpot increased; 2) top jackpot paid as a lump sum instead of installment over time; 3) extra coins for a given outcome; 4) extra coins for all outcomes; 5) extra coins for a subset of outcomes; 6) extra coin payouts during bonus rounds; 7) extra coins added at cashout; 8) extra bonuses added at cashout; 9) providing a payout where there previously was none.

Examples of benefits relating to probabilities include but are not limited to: 1) probability of top jackpot increased; 2) probability of all payouts increased; 3) probability of a subset of outcomes increased; 4) probability of negative outcomes decreased; 5) probability of entering bonus round increased; 6) ability to re-spin one of the reels; 7) additional bonus symbols added to one or more reels; 8) probability of one more bonus symbols being selected increased; 9) removal of negative symbols from one or more reels; 10) joker or other wildcard added to a deck of cards; 11) after an initial video poker hand is dealt, cards not helpful to a player's hand may be removed from remaining deck; 12) second draw allowed in video poker; 13) a payout table may be modified (e.g., as shown in FIG. 6).

Examples of benefits in the form of game advantages include but are not limited to: 1) ability to summon game characters to modify outcomes: 2) game characters become more powerful or have enhanced tools; 3) hints provided during bonus round games as to optimal selections; 4) strategy hints provided during bonus rounds; 5) faster accumulation of collected game symbols (e.g. more rapid accumulation of slices of a pie which pays a bonus when the whole pie is completed). Examples of benefits of money include; 1) credits may be added to a player's credit balance on a game machine; 2) a game machine may dispense at least one coin or bill; 3) a recurring payment may be provided to a player (e.g., a player may receive 10 credits per hour for each hour that he keeps his balance above 100 coins); 4) a financial account belonging to a player may be credited (e.g., a bank account, a credit card account).

Examples of financial benefits include but are not limited to: 1) interest earned on average balance for each handle pull; 2) interest earned on average balance for a session; and 3) interest earned on highest balance achieved over session. Examples of benefits relating to a cost per wager include but are not limited to: 1) decreased cost per handle pull; 2) free spins every X handle pulls; 3) extra paylines enabled at reduced cost (or free); 4) extra hands provided in multi-play video poker; 5) top jackpot enabled without requirement of max coin; 6) free spins as long as the player keeps a minimum balance of at least $25 or 100 coins in a 25 cent machine, he receives a free spin any time he wins a payout of more than 20 coins; 7) free jackpot only spins—the player receives 3 free jackpot only spins any time he has the minimum balance in the machine and wins a payout of more than 20 coins.

Examples of complimentary awards include but are not limited to: 1) double or triple comp points: 2) rate of cash back earned increased; 3) fewer coins-in required to earn one comp point. Examples of merchandise include: 1) promotional items such as hats, key chains, t-shirts, etc.; 2) subscriptions to magazines; 3) prepaid phone cards. Examples of non-negotiable tokens include coins which have no redemption value but can be used in slot machines/table games to win real tokens.

Examples of discounts include but are not limited to: 1) percentage discounts on food, beverage, rooms, show tickets at the casino; 2) discounts at casino logo shop; 3) discounts on merchandise at a casino owned shopping mall.

Examples of entertainment-related benefits include but are not limited to: 1) free/reduced price phone calls; 2) access to music MP3s; 3) video clips; 4) movie trailers; 5) access to Internet; 6) access to premium (paid) Internet site.

Examples of services that may be provided as benefits include but are not limited to: earning gold player status which allows: faster drink service, unlimited line passes, later checkout times, ability to lock up machine for an extended period of time, access to premium gaming areas, access to priority reservations system, and room upgrades.

According to one embodiment, a benefit may be provided to a party associated with the player (e.g., a friend of the player, a family member, a charity).

Figure 9:
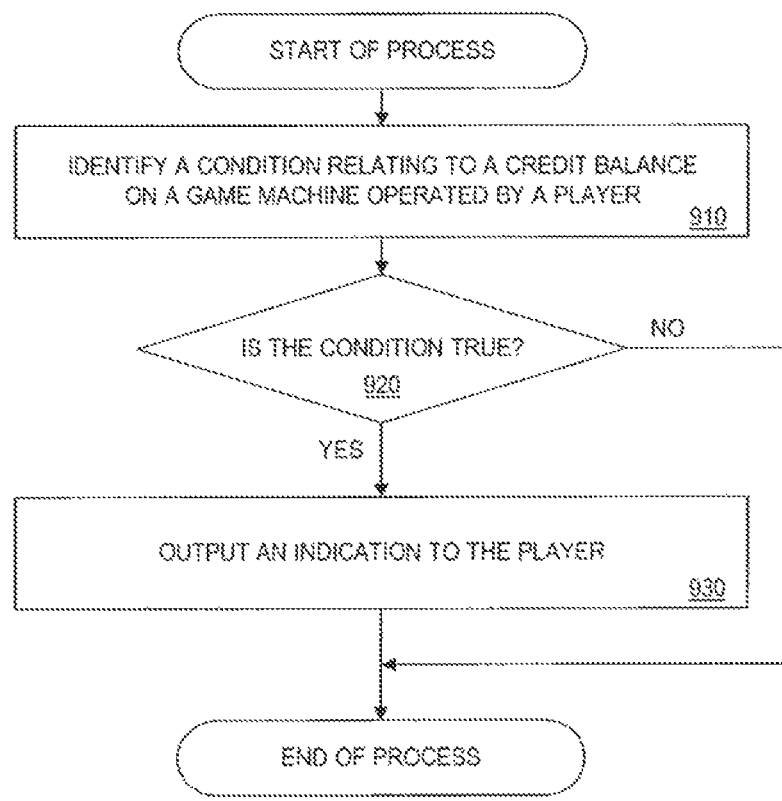
FIG. 9 is a flow-chart depicting a method of providing an indication to a player based on a condition in accordance with an embodiment of the present invention.

Although the method of the invention has been described as providing a benefit based on a condition, the invention may also comprise providing an indication to the player that a benefit may be provided if the credit balance is increased or maintained above a certain threshold. In addition to providing a benefit, the controller 110 may provide an indication based on a condition. FIG. 9 is a flow diagram representing a method of providing an indication based on a condition to a player. As shown in FIG. 9, the steps 910 and 920 are identical to the first two steps in FIG. 8, steps 810 and 820 regarding providing a benefit to the player. These steps have already been described above. First the controller 110 must identify a condition relating to a credit balance on a game machine operated by a player (step 910); then the controller 110 determines if the condition is true (step 920). If the condition is true, the controller 110 will provide the indication associated with the condition. Alternatively, the game machine 120-140 may perform some or all of the steps performed by controller 110 alone or in communication with controller 110.

In alternative embodiments of this invention, the steps discussed above with regard to FIG. 9 may be practiced independently of the steps described above. In one embodiment, a benefit may be provided based on a condition, but no indication may be output based on the condition. For example, a player may receive a benefit of a better payout table if his credit balance is greater than 120 coins. In an alternative embodiment, a benefit may be provided based on a condition, and an indication may be output based on the same condition. For example, a player may receive a benefit of a better payout table if his credit balance is greater than 120 coins. An indication may be output to the player, "Since your balance is greater than 120 coins, your winnings will be determined based on this modified payout table." Another embodiment is that the benefit may be provided based on a first condition, and an indication may be output based on a second condition. For example, a player may insert $5 into a slot machine, increasing his credit balance from $3.25 to $8.25. Since the player increased his balance by $5 (a first condition), he may receive a benefit of a free spin on the slot machine. However, since the player's credit balance rose to a value between $8 and $10, an indication may be output to the player, "If you increase your balance to more than $10, then you get 3 free spins." In a second example, a player's credit balance on a game machine may fall from 132 to 129 coins. Since the player's current credit balance of 129 coins is greater than 120 coins, the player may receive a benefit of a better payout table. However, an indication may be output to a player because his credit balance fell below 130 coins, "If you increase your balance to more than 130 coins, then you will get 2 free coins." Another example is that an indication may be output based on a condition, but no benefit may be provided based on the condition. For example, a player's credit balance on a game machine may fall from 122 to 119 coins. Based on this condition, an indication may be output to a player, "Your current balance is less than 120 coins! Increase your balance to continue using the better payout table." One common embodiment is to provide benefits for increases in a player's credit balance, but to output indications for decreases in a player's credit balance. Of course, many other embodiments are also possible.

In determining the indication (part of step 930), controller 110 may use the information stored in indication database 390, shown in FIG. 7. For example, record 740, IND-081234498-03, shows that if a $10 bill is inserted into a bill acceptor, the following indication will be provided "IF YOU INSERT ANOTHER $10, YOU'LL GET 3 MORE COINS AS A BONUS."

Different types of indications based on a condition include but are not limited to: 1) an indication of the condition; 2) an indication of how to change the condition; 3) an indication of a benefit to be provided based on the condition; 4) an indication of a threshold value that is part of the condition. According to one embodiment, controller 110 may output an indication of a condition. For example, "Your credit balance is less than 120 coins" or "Your credit balance just rose over 50 coins."

According to one embodiment, controller 110 may output an indication of how to change a condition. For example, "Insert more money to increase your credit balance," "You can maintain a higher average credit balance by inserting more money before your credit balance drops to zero," or "You get a free spin each time you insert a $10 bill." According to one embodiment, a game machine 120-140 or the controller 110 may output an indication of a benefit that may be provided or not provided based on the condition. According to one embodiment, the controller 110 may determine a benefit to be provided based on a condition by accessing a benefit database such as the one shown in FIG. 5. Examples of indications of benefits include but are not limited to: "If your credit balance is more than 120 coins, then you get a better payout table"; and "Based on your credit balance, you get a bonus of 2 free jackpot-only spins."

According to one embodiment, controller 110 may output an indication of a threshold value to which a credit balance or other variable is compared. Examples include: 1) "Your credit balance is less than $20. If you increase your credit balance to more than $20, you'll get a free ticket for a dinner buffet"; and 2) "Your average credit balance for the last hour is 134.5 coins, which is greater than 100 coins, so you get a free spin."

According to one embodiment, controller 110 may also output an indication of at least one other condition or at least one other benefit. For example, "Your credit balanced increased past 200 coins, so you get a 10 coin bonus" or "If you increase your balance over 300 coins, then you get a 15 coin bonus."

According to one embodiment of the invention, an indication of a condition may be output to a player using at least one output device 240 on a game machine 120-140. An indication based on a condition may be output in a variety of different forms, including but not limited to: 1) text—for example, a message may be displayed on a video screen; 2) audio—for example, a 'beep' sound may be output anytime a lesson is displayed on a video screen; 3) video—for example, an image or sequence of images (e.g., a movie) may be displayed to a player using a video screen; 4) binary—for example, a light emitting diode (LED) on a slot machine may act as a warning light—lighting up if a condition is false (and a player may not receive a benefit) and turning off if the condition is true (and a player may receive a benefit.); and 5) through a partition window. According to one embodiment, a partition may be a video screen or an area of a video screen that is used to display related information. Examples of partitions include but are not limited to: headers, footers, sidebars, windows, overlays, and pop-up windows. For example, a header may overlaid across the top of a video screen. This header may display messages to a player describing conditions that occur and benefits that are provided to the player.

According to one embodiment, various visual cues may be used to draw a player's attention to an indication that is displayed. Examples of visual cues include but are not limited to: color, fonts, highlighting, transparency, and animation. For example, an indication may be output as a text overlay on a video screen showing spinning slot machine reels.

In another embodiment, a portion of a game may be modified to provide an indication. For example, icons on the reels of a slot machine may be modified to provide an indication to a player. In a second embodiment, an indication may be output by changing the design of a deck of cards in video poker. Furthermore, an avatar, virtual assistant, or other on-screen character may be displayed to a player in conjunction with an indication. For example, an animated rabbit may be displayed on video screen and "talk" to a player based on conditions. Indications from the rabbit may be provided as both text, or as audio.

According to one embodiment, a plurality of indications may be output. Examples include but are not limited to: 1) a text message, "You get a free spin each time you insert a $10 bill" may be displayed in a pop up window, and a bell may ring; 2) a light bulb may flash and a red text may be overlaid on a video screen "Your credit balance has been over 100 coins for the last hour, so you get a bonus of 3 free jackpot-only spins. If you keep your balance above 100 coins for another hour, then you'll get 4 more free jackpot-only spins."

ADDITIONAL EMBODIMENTS

According to one embodiment, a first player may receive a benefit based on a credit balance maintained by a second player. For example, a brother and his sister may both play game machines at a casino. If the brother maintains a balance of more than 100 credits on his slot machine, then both he and his sister may receive a free spin every 20 games. In this case, controller 110 would store information based on the related players in data storage device 340 and use that information in order to run the steps iterated above on at least two game machines 120-140.

Examples of first players associated with second players include but are not limited to: 1) players operating a nearby slot machine: 2) players sharing a room; 3) players who arrived on the same bus; 4) players from the same family, group of friends, and other group associations.

According to one embodiment, an indication based on a first player's credit balance may be output to a second player. Outputting an indication to the second player may motivate the second player to encourage the first player (e.g., to increase his credit balance, or to congratulate him on maintaining a high credit balance). Hence controller 110 would provide an indication through the output device of player two based on a condition of player one's game session.

According to one embodiment, when the player requests cash out (e.g., by pressing a 'CASH OUT' button on the gaming device) the gaming device provide the player with an offer for a benefit in exchange for maintaining a minimum credit balance. To be attractive and more acceptable, the benefit should typically (though not necessarily) be larger than previously offered/provided benefits for comparable player behavior.

According to one embodiment, a player may be provided with benefits before he meets conditions required for those benefits. The player might instead promise to meet those conditions in the future.

It will be apparent to those skilled in the art that various modifications and variations can be made in the system and method of the present invention without departing from the spirit or scope of the invention. For example, the databases prescribed above may reside in one or more databases stored in the data storage devices of either the game machine 120, 130, or 140 or controller 110. The present invention covers the modifications and variations of this invention provided they come within the scope of the appended claims and their equivalents.

The invention is claimed as follows:

1. A gaming system comprising:
a housing;
a plurality of input devices supported by the housing, said plurality of input devices including:
  (i) an acceptor, and
  (ii) a cashout device;
at least one display device supported by the housing;
at least one processor; and
at least one memory device which stores a plurality of instructions, which when executed by the at least one processor, cause the at least one processor to operate with the at least one display device and the plurality of input devices to:
  (a) if a physical item is received via the acceptor, establish a credit balance based, at least in part, on a monetary value associated with the received physical item,
  (b) determine an amount of the credit balance,
  (c) if the determined amount of the credit balance is at least a threshold amount:
    (i) receive a wager amount placed on a play of a first game, said first game being associated with a first paytable, and said credit balance being decreasable based on the wager amount placed on the play of the first game, and
    (ii) for the play of the first game:
      (A) randomly determine a game outcome,
      (B) display the randomly determined game outcome,
      (C) determine any game award associated with the randomly determined game outcome, and
      (D) display any determined game award, said credit balance being increasable based on any determined game award,
  (d) if the determined amount of the credit balance is less than the threshold amount:
    (i) receive the wager amount placed on a play of a second game, said second game being associated with a second, different paytable, said credit balance being decreasable based on the wager amount placed on the play of the second game, and
    (ii) for the play of the second game:
      (A) randomly determine a game outcome,
      (B) display the randomly determined game outcome,
      (C) determine any game award associated with the randomly determined game outcome, and
      (D) display any determined game award, said credit balance being increasable based on any determined game award; and
  (e) if a cashout input is received via the cashout device, cause an initiation of any payout associated with the credit balance.

2. The gaming system of claim 1, wherein the first paytable has a first average expected payback percentage and the second paytable has the first average expected payback percentage.

3. The gaming system of claim 1, wherein the first paytable is associated with a first range of award values and the second paytable is associated with the first range of award values.

4. The gaming system of claim 1, wherein the first paytable is associated with a first plurality of game outcomes and the second paytable is associated with the first plurality of game outcomes.

5. The gaming system of claim 1, wherein at least one of the determined amount of the credit balance, the placed wager amount, any determined game award for the play of the first game and any determined game award for the play of the second game is at least one selected from the group consisting of: a quantity of monetary credits, a quantity of non-monetary credits, a quantity of promotional credits, and a quantity of player tracking points.

6. A method of operating a gaming system, said method comprising:
   (a) causing at least one processor to execute a plurality of instructions to determine an amount of a credit balance, said credit balance being: (i) increasable via an acceptor of a physical item associated with a monetary value, and (ii) decreasable via a cashout device,
   (b) if the determined amount of the credit balance is at least a threshold amount:
      (i) receiving a wager amount placed on a play of a first game, said first game being associated with a first paytable, and said credit balance being decreasable based on the wager amount placed on the play of the first game, and
      (ii) for the play of the first game:
         (A) causing the at least one processor to execute the plurality of instructions to randomly determine a game outcome,
         (B) causing at least one display device to display the randomly determined game outcome,
         (C) causing the at least one processor to execute the plurality of instructions to determine any game award associated with the randomly determined game outcome, and
         (D) causing the at least one display device to display any determined game award, said credit balance being increasable based on any determined game award, and
   (c) if the determined amount of the credit balance is less than the threshold amount:
      (i) receiving the wager amount placed on a play of a second game, said second game being associated with a second, different paytable, and said credit balance being decreasable based on the wager amount placed on the play of the second game, and
      (ii) for the play of the second game:
         (A) causing the at least one processor to execute the plurality of instructions to randomly determine a game outcome,
         (B) causing the at least one display device to display the randomly determined game outcome,
         (C) causing the at least one processor to execute the plurality of instructions to determine any game award associated with the randomly determined game outcome, and
         (D) causing the at least one display device to display any determined game award, said credit balance being increasable based on any determined game award.

7. The method of claim 6, wherein the first paytable has a first average expected payback percentage and the second paytable has the first average expected payback percentage.

8. The method of claim 6, wherein the first paytable is associated with a first range of award values and the second paytable is associated with the first range of award values.

9. The method of claim 6, wherein the first paytable is associated with a first plurality of game outcomes and the second paytable is associated with the first plurality of game outcomes.

10. The method of claim 6, wherein at least one of the determined amount of the credit balance, the placed wager amount, any determined game award for the play of the first game and any determined game award for the play of the second game is at least one selected from the group consisting of: a quantity of monetary credits, a quantity of non-monetary credits, a quantity of promotional credits, and a quantity of player tracking points.

11. The method of claim 6, which is operated through a data network.

12. The method of claim 11, wherein the data network is an internet.

13. A non-transitory computer readable medium including a plurality of instructions, which when executed by at least one processor, cause the at least one processor to:
   (a) determine an amount of a credit balance, wherein said credit balance being: (i) increasable via an acceptor of a physical item associated with a monetary value, and (ii) decreasable via a cashout device;
   (b) if the determined amount of the credit balance is at least a threshold amount:
      (i) receive a wager amount placed on a play of a first game, said first game being associated with a first paytable, and said credit balance being decreasable based on the wager amount placed on the play of the first game, and
      (ii) for the play of the first game:
         (A) randomly determine a game outcome,
         (B) cause at least one display device to display the randomly determined game outcome,
         (C) determine any game award associated with the randomly determined game outcome, and
         (D) cause the at least one display device to display any determined game award, said credit balance being increasable based on any determined game award, and
   (c) if the determined amount of the credit balance is less than the threshold amount:
      (i) receive the wager amount placed on a play of a second game, said second game being associated with a second, different paytable, and said credit balance being decreasable based on the wager amount placed on the play of the second game, and
      (ii) for the play of the second game:
         (A) randomly determine a game outcome,
         (B) cause the at least one display device to display the randomly determined game outcome,
         (C) determine any game award associated with the randomly determined game outcome, and
         (D) cause the at least one display device to display any determined game award, said credit balance being increasable based on any determined game award.

14. The non-transitory computer readable medium of claim 13, wherein the first paytable has a first average expected payback percentage and the second paytable has the first average expected payback percentage.

15. The non-transitory computer readable medium of claim 13, wherein the first paytable is associated with a first range of award values and the second paytable is associated with the first range of award values.

16. The non-transitory computer readable medium of claim 13, wherein the first paytable is associated with a first plurality of game outcomes and the second paytable is associated with the first plurality of game outcomes.

17. The non-transitory computer readable medium of claim 13, wherein at least one of the determined amount of the credit balance, the placed wager amount, any determined game award for the play of the first game and any determined game award for the play of the second game is at least one selected from the group consisting of: a quantity of monetary credits, a quantity of non-monetary credits, a quantity of promotional credits, and a quantity of player tracking points.

* * * * *